UNITED STATES PATENT OFFICE.

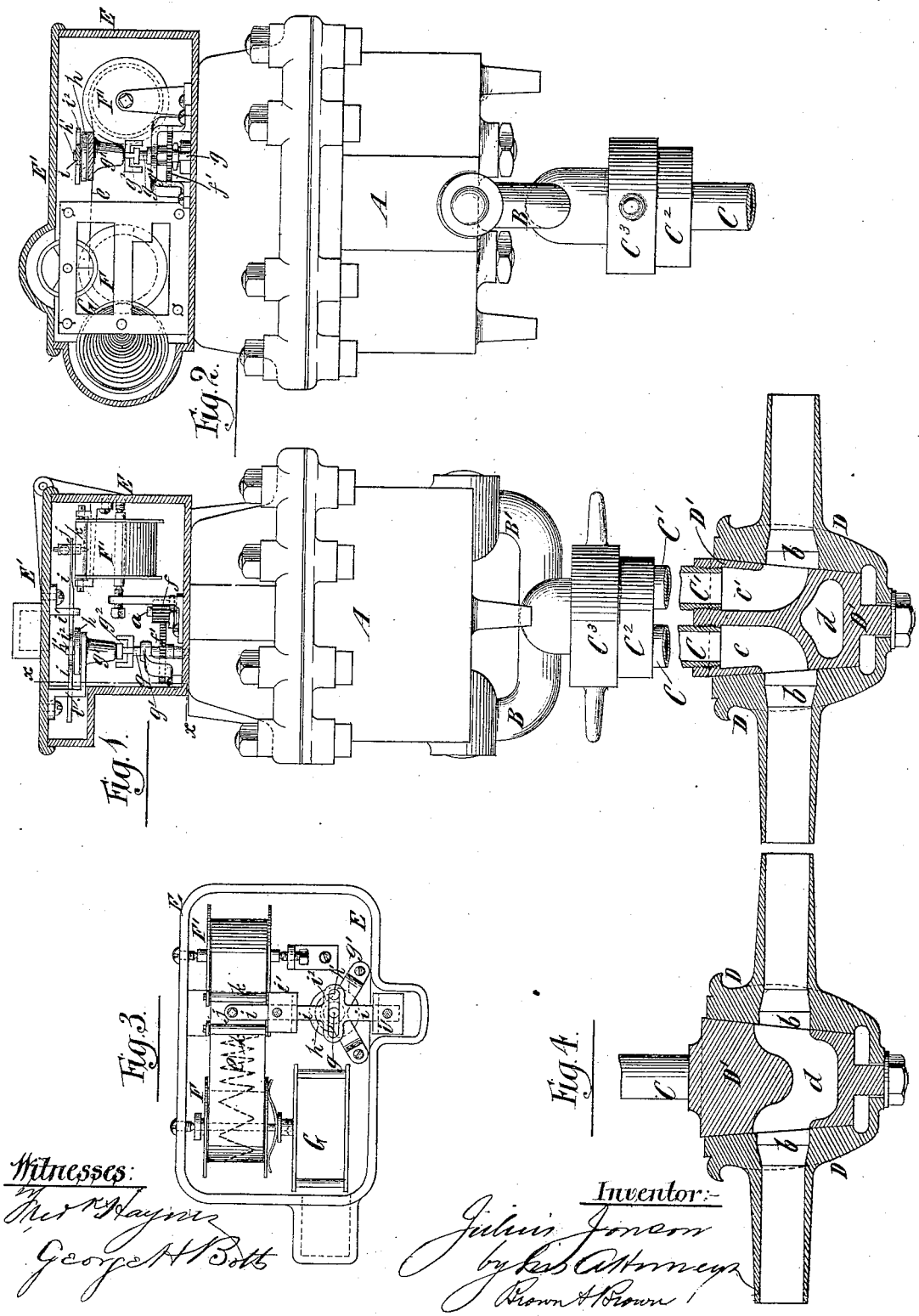

JULIUS JONSON, OF NEW YORK, N. Y., ASSIGNOR OF ONE-HALF TO JULIUS ELSON, OF SAME PLACE.

WATER-METER CONNECTION.

SPECIFICATION forming part of Letters Patent No. 265,327, dated October 3, 1882.

Application filed August 23, 1881. (No model.)

*To all whom it may concern:*

Be it known that I, JULIUS JONSON, of the city and county of New York, in the State of New York, have invented certain new and useful Improvements in Service-Cocks and Waste-Water Meters, of which the following is a specification.

My invention is applicable to waste-water meters which are adapted to be connected with the service-pipe of a building upon the exterior thereof, and to show the amount of water wasted by reason of leakage or other causes in any given time.

My invention consists in the combination, with a service-cock composed of a shell having a straight water-way and a plug having a direct water-way ranging with that in the shell, and also having water-ways ranging with that in the shell and leading through the head of the plug, of pipes extending from the water-ways in the head of the plug, and a water-meter having said pipes connected, one with its water-inlet and the other with its water-outlet. When the meter is disconnected from said pipes the plug of the cock is turned so that the water passes directly through it; but when the meter is connected the plug is turned so that the water flows through the head of the plug up one of said pipes, through the meter down the other pipe, and thence to the house or building to be supplied.

In the accompanying drawings, Figure 1 represents an end view of a meter and a vertical section of a box or case containing my improved registering mechanism, and of a service-cock also embodying my improvements. Fig. 2 represents a side view of the meter and a section through my improved registering mechanism upon the dotted line $x$ $x$, Fig. 1. Fig. 3 represents a plan of my improved registering mechanism, and Fig. 4 represents a sectional view of my improved service-cock with the plug in different position from that shown in Fig. 1.

Similar letters of reference designate corresponding parts in all the figures.

A designates a water-meter, which may be of any ordinary or suitable construction. This meter is not altered in any way, except that its dial-registering mechanism is not used and its rotary indicating or registering spindle $a$ is continued through the top.

B B' designate the water inlet and outlet, and C C' designate vertical inlet and outlet pipes, which are inserted into a common head, $C^2$, and by a horn band, $C^3$, are connected with the meter.

D designates the shell of the service-cock, which is secured in the service-pipe, and D' designates the plug thereof, into which the lower ends of the pipes C C' are inserted. In the shell of the cock is the usual water-way, $b$, and in the plug are two water-ways, $c$ $c'$, which extend through the head of the plug and register with the water-way $b$. In the lower part of the plug is a transverse water-way, $d$, which will register with the water-way $b$ when the plug is turned and permit the water to flow directly to the house without passing through the meter. Where it is designed ever to apply a waste-water meter a service-cock of this construction should be used, and the pipes C C' are long enough to reach to the surface of the ground where the meter is applied. Ordinarily the plug D' is turned into the position shown in Fig. 4, with the water-way $d$ registering with $b$; but when it is desired to try the meter it is secured to the upper ends of the pipes C C', or, rather, to the head $C^2$, and the meter, pipes, and plug are then turned to bring the plug into the position shown in Fig. 1, so that the ports $c$, $c'$, and $b$ will register.

Turning now to my registering apparatus, E designates a box or case secured upon the top end of the meter A, and provided with a hinged cover, E', which may be opened to afford access to the interior thereof. In the box or case E are mounted two drums or rollers, F F', the former of which has a positive rotary motion imparted to it by a clock-work mechanism, G, which is not very fully represented here, as it is of ordinary construction. A strip, $e$, of paper or other like material, is put into the box or case E, wound or rolled upon the drum or roller F', and as the clock-work G operates it imparts a slow rotation to the drum or roller F and draws the strip $e$ from off the drum or roller F' and winds it upon the drum or roller F. Upon the upper end of the indicating or registering spindle $a$ of the meter, which projects into the box or case E, is a pinion, $f$; and $f'$ designates a spur-wheel, which is secured upon a shaft, $g$, and through which a rotary motion is transmitted from the spindle $a$ to the shaft $g$. The shaft $g$ is mounted in suitable bearings, $g'$, and is made in two pieces connected by a coupling, $g^2$, as clearly seen in Figs. 1 and 2. Upon the upper end of the shaft $g$ is a crank, $h$, provided with a crank-pin, $h'$; and $i$ designates a rod or bar arranged in suitable bearings, $i'$, and comprising a transverse slot or yoke, $i^2$, which receives the crank-pin $h'$. The end of the rod or bar $i$ which is over the strip $e$ carries a pencil or tracing-point, $j$, that is arranged to bear upon said strip; and it will be clearly seen that the water passing through the meter will set the spindle $a$, and through it the shaft $g$, in motion and effect the reciprocation of the rod or bar $i$. The strip $e$ is moved forward by the clock-work at a uniform speed, while the reciprocation of the rod or bar $i$ will vary with the amount of water passing through the meter. Thus when a large quantity of water is passing through the meter the rod or bar $i$ will be reciprocated quickly, and the pencil or point $j$ will describe a zigzag line, the angles of which are acute, upon the strip $e$. When, however, there is a small quantity of water passing through the meter the rod or bar $i$ will be reciprocated slowly, and the zigzag line produced by the pencil or point $j$ will have obtuse angles and be more nearly straight. One part of the dotted zigzag line on the strip $e$, (seen in Fig. 3,) indicates a great consumption or waste of water, while another part of the line indicates a lesser consumption or waste. It is evident that the level of the strip $e$ will vary slightly as it is unwound from the drum or roller F, and to hold the strip always in the same position relatively to the pencil or point $j$, I employ rollers $k$, under which the strip $e$ passes, as seen in Figs. 1 and 2.

It will be seen that by my invention I enable a permanent and accurate register to be obtained, which may be kept and referred to at any time, and which is much more satisfactory than a record obtained by readings from an ordinary meter dial which are obliterated afterward.

I am aware that steam-gages and other registering apparatus have been made in which a pencil is reciprocated or moved over a moving strip of paper; and I do not therefore claim this as of my invention. In such apparatus the pencil or marker is commonly reciprocated or moved more or less in proportion to the varying pressure or flow of the fluid, while in my apparatus the pencil has a uniform and unvarying length of travel, and is reciprocated more or less rapidly as the velocity of the flowing water increases or decreases, and positively in both directions.

What I claim as my invention, and desire to secure by Letters Patent, is—

The combination, with a service-cock composed of a shell having a straight water-way and a plug having a direct water-way ranging with that in the shell, and also having water-ways ranging with that in the shell and leading through the head of the plug, of pipes extending from the water-ways in the head of the plug and a water-meter having said pipes connected, one with its water-inlet and the other with its water-outlet, substantially as and for the purpose specified.

JULIUS JONSON.

Witnesses:
FREDK. HAYNES,
ED. GLATZMAYER.